Patented Aug. 16, 1927.

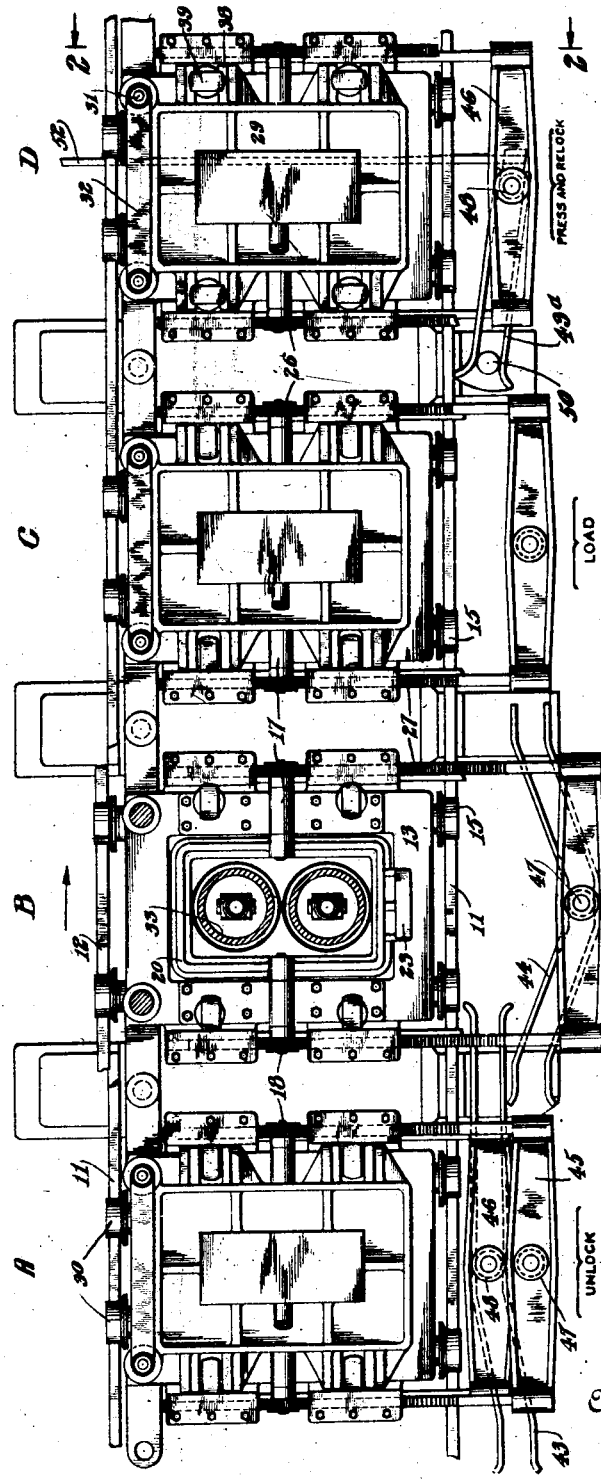

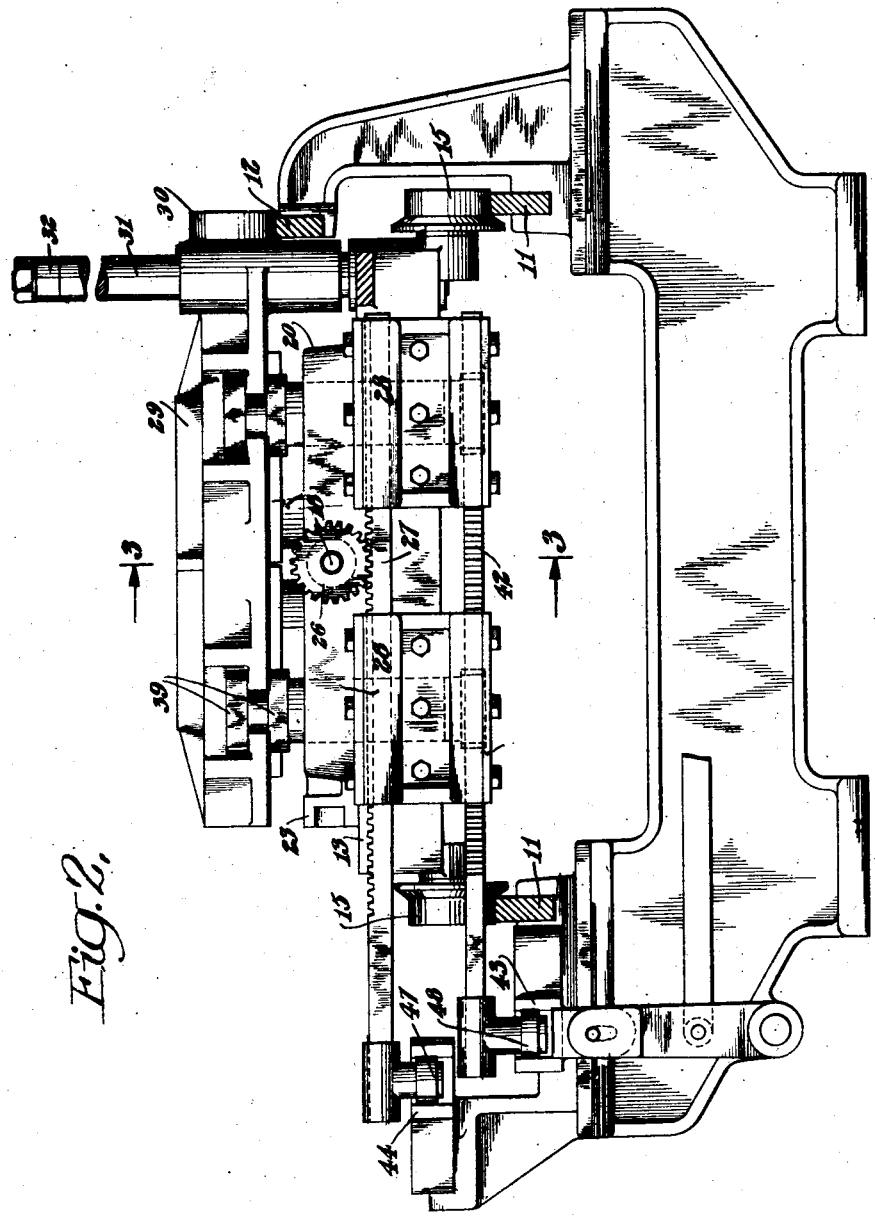

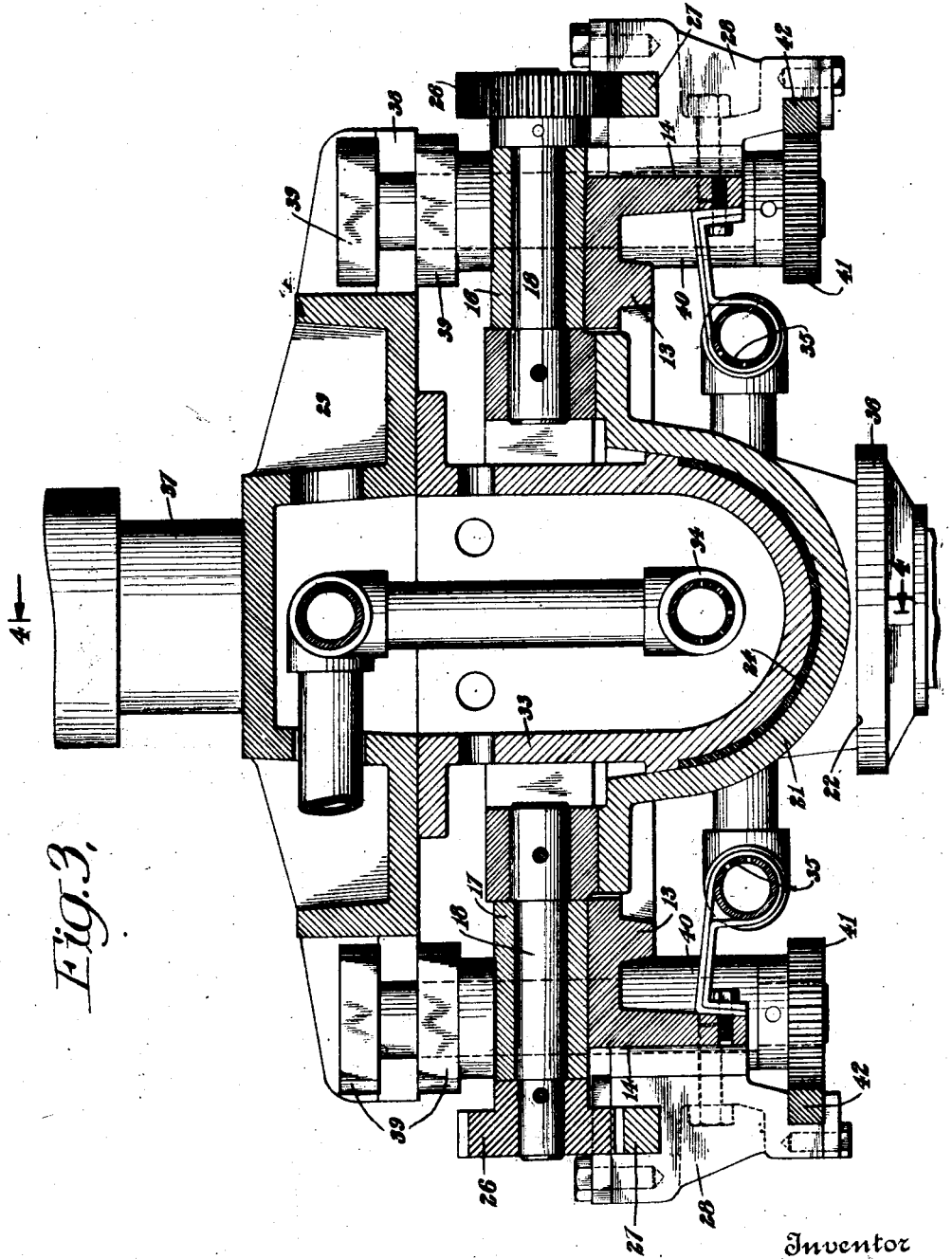

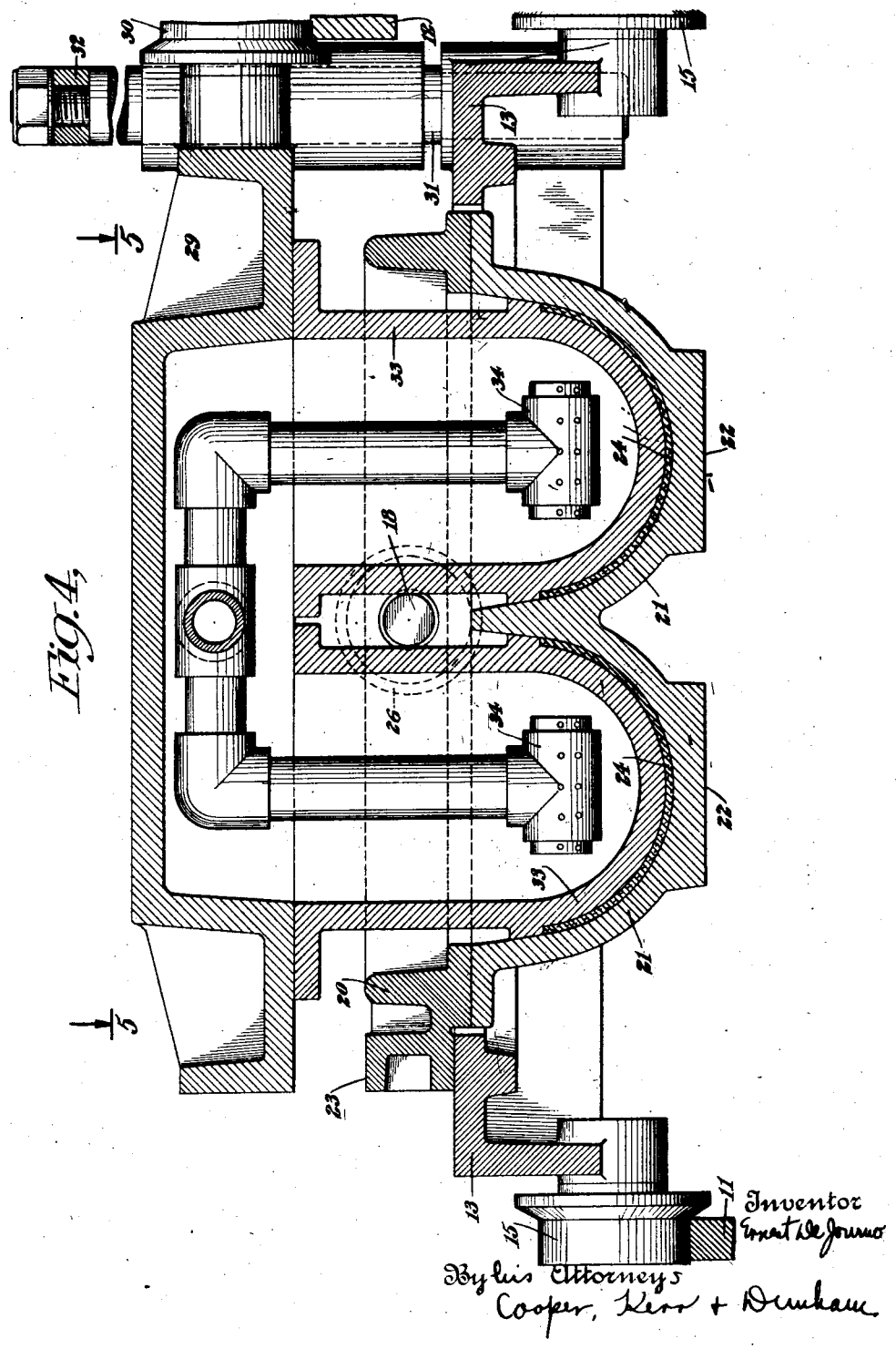

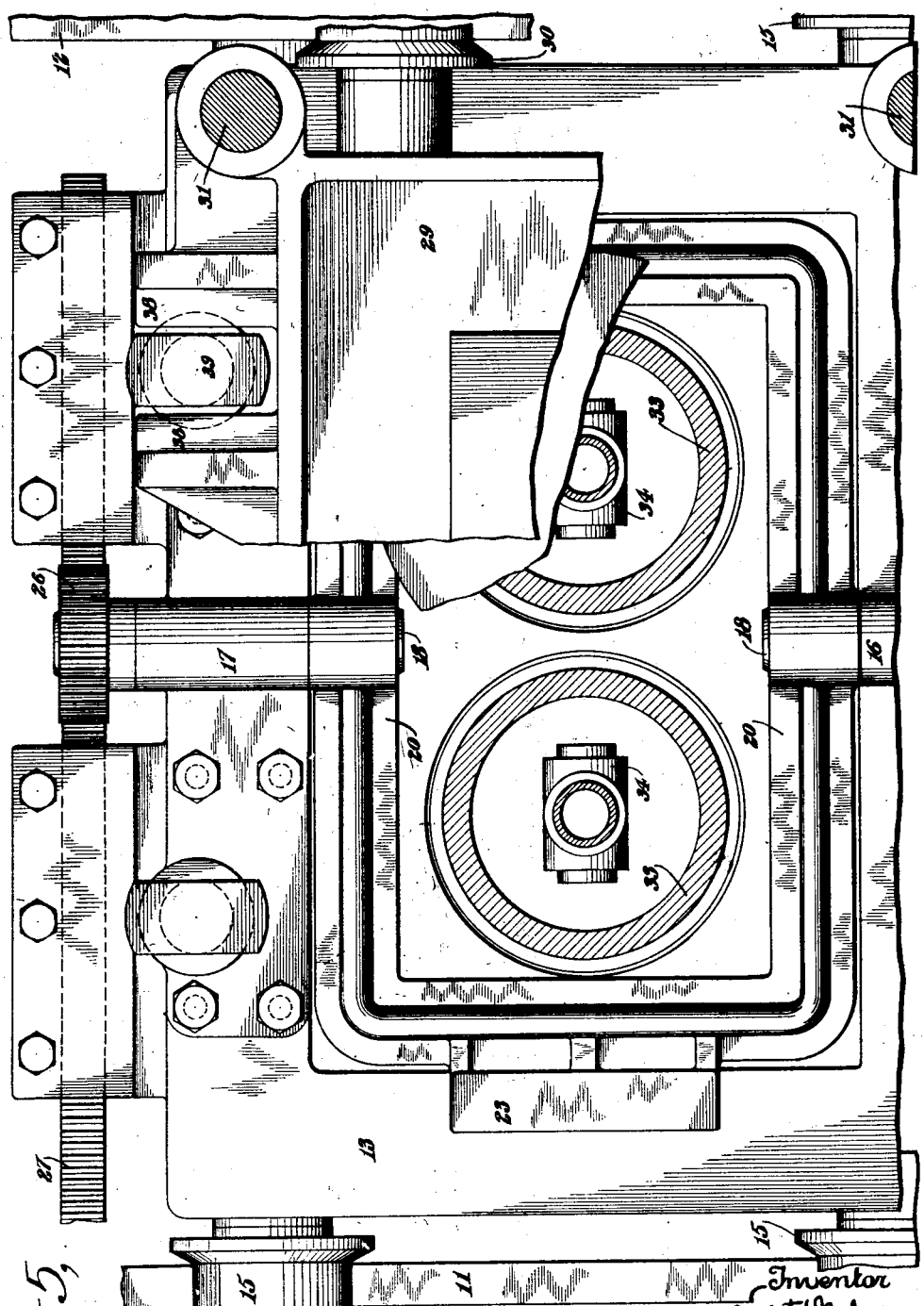

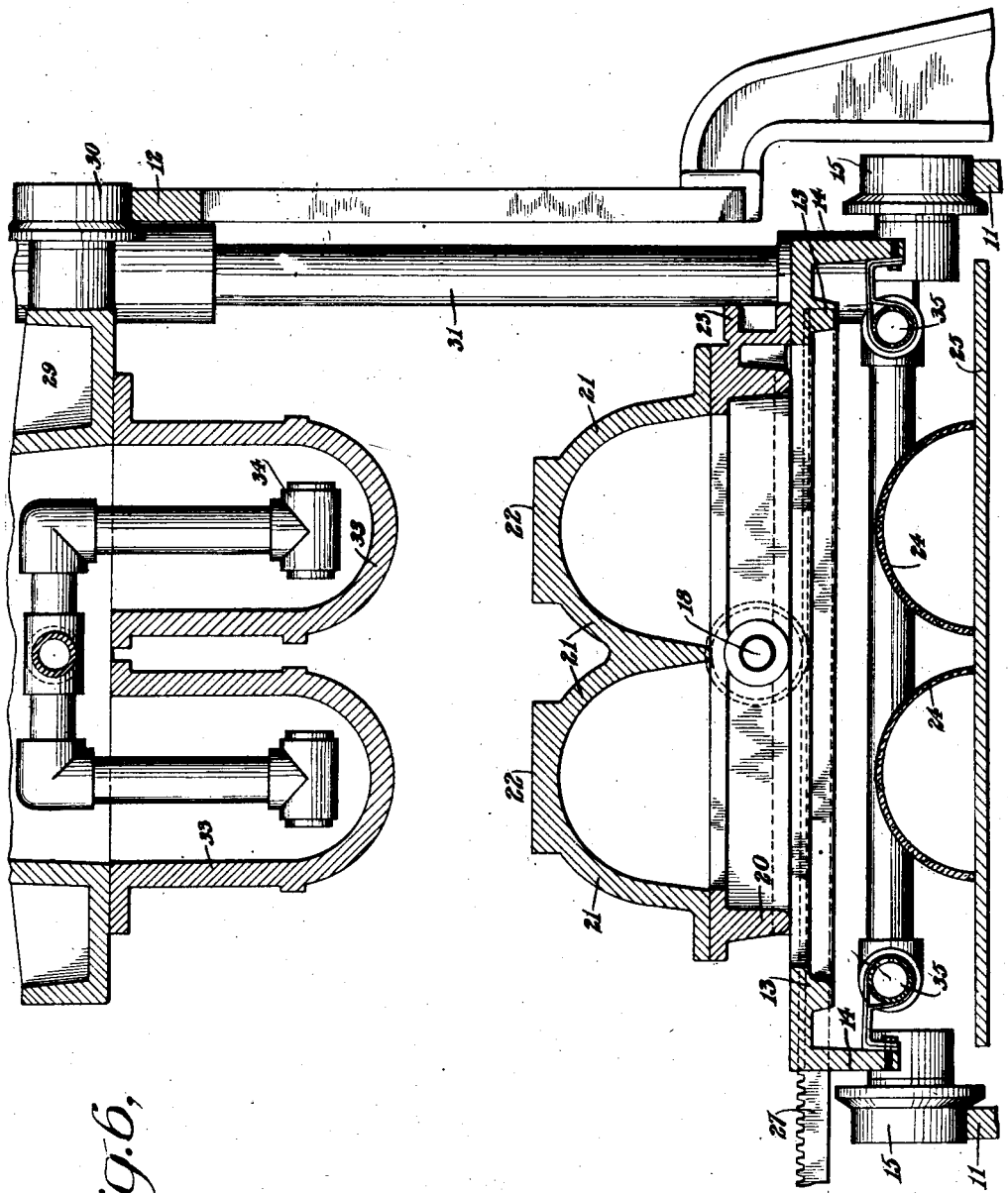

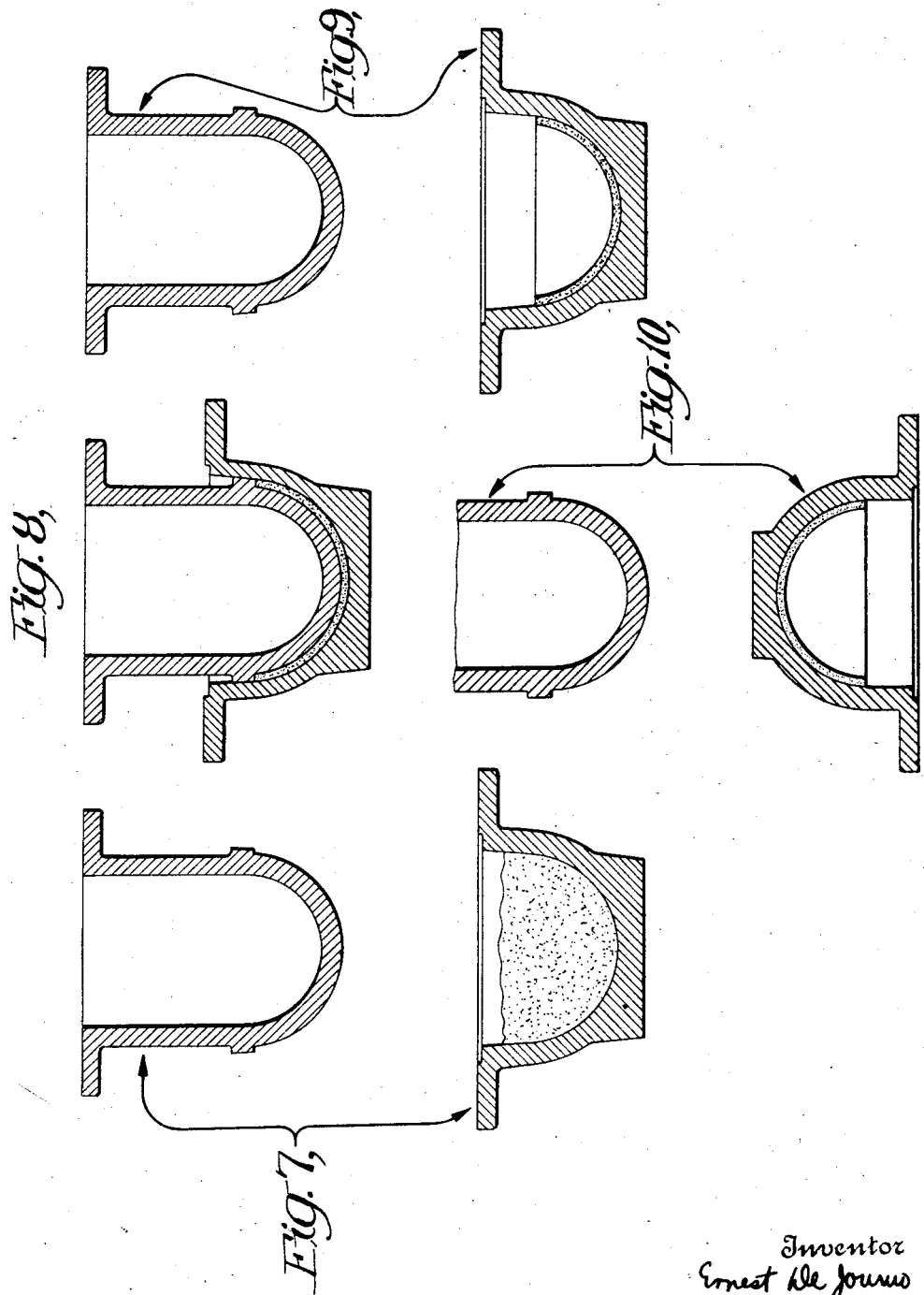

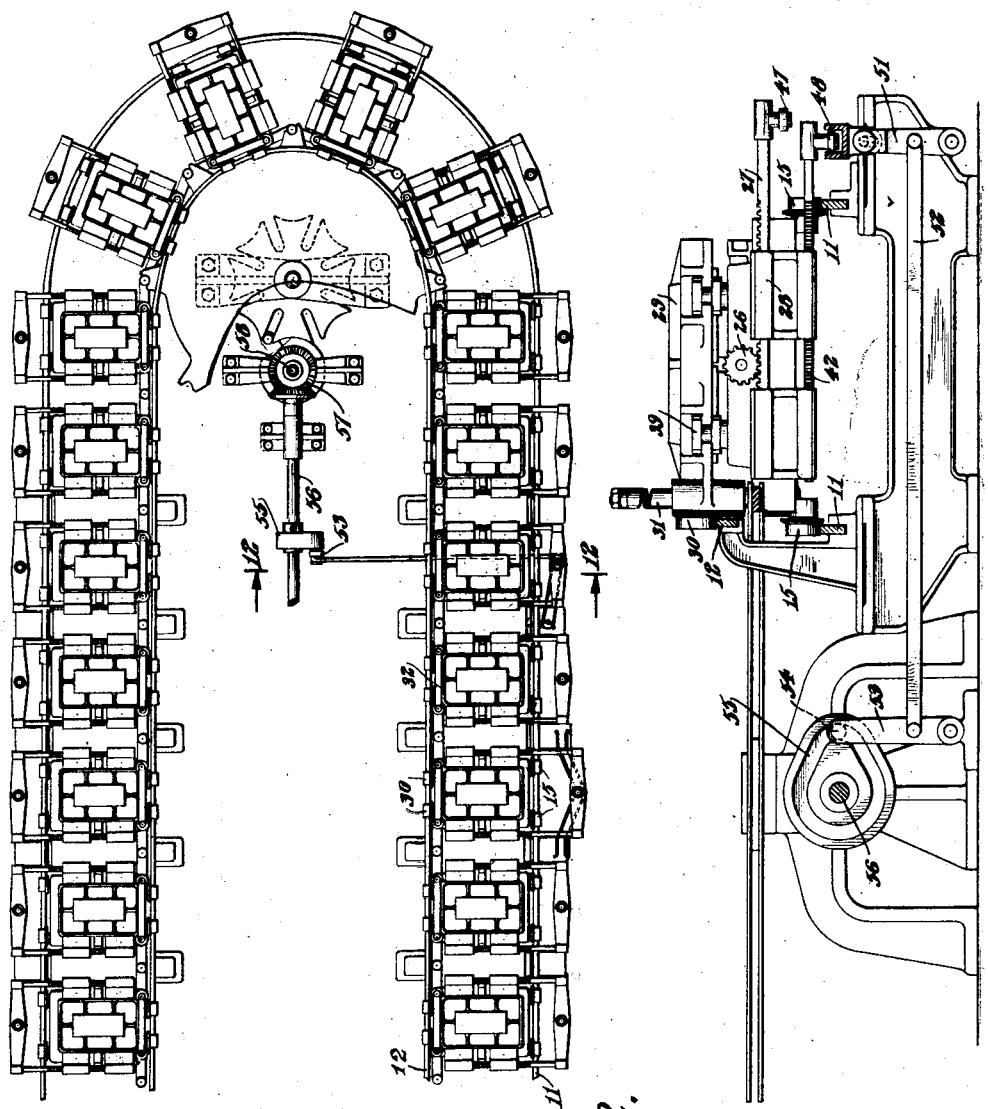

1,639,081

UNITED STATES PATENT OFFICE.

ERNEST DE JOURNO, OF NEW YORK, N. Y., ASSIGNOR, BY MESNE ASSIGNMENTS, TO DE JAY TRADING CORPORATION, A CORPORATION OF NEW YORK.

DIE-MOLDING APPARATUS FOR MAKING ARTICLES OF PLASTIC MATERIAL.

Application filed June 21, 1924. Serial No. 721,390.

The present invention relates to a machine for molding articles and more particularly relates to an improved die construction which particularly lends itself to permitting the molded article to be readily discharged from the die which contains the mold cavity or cavities.

One object of the present invention resides in the provision of a die construction wherein the die parts which carry the articles after molding operations are completed are adapted to be tilted or reversed to permit the molded article or articles to be dislodged therefrom. Preferably but not necessarily the tilting of the dies is effected in such a way that a shock is imparted to the parts as the reversing operation is completed so that the article or articles will be dislodged from the die.

A further object of the present invention resides in the provision of a molding machine in which molding of articles which necessitate completely closed molds may be carried in a series of continuous or successive steps thereby securing a rapid production of the articles with the minimum of labor.

A further object of the present invention resides in the provision of a machine which will automatically operate upon a series of molds to place the same in condition to receive a charge of material, to thereafter close the molds and carry out the molding operation, to thereafter open the molds and subsequently tilt or reverse such parts as carry the completed molded parts.

In my copending application, Serial No. 490,865, filed August 9, 1921, I have shown and described a continuously operating machine for forming die-molded articles of plastic material. In this form of machine I utilized a series of dies which progressed around a track. Each die was of a three part construction. The cycle of the machine briefly was as follows: The three parts of each die or mold were first opened. The dies then progressed to a loading station where a charge of plastic material was placed in the dies. The dies were then closed and the material compressed. Subsequently the closed dies passed through a heating section of the machine. Subsequently the three part dies were opened and the completed article was ejected from the middle die or mold section in a downward direction. Thereafter the various operations were repeated.

In the present construction in place of employing a three part die I employ a two part die and mold construction. In place of discharging the completed article from the intermediate or middle mold section I employ a tilting construction for the lower die or mold section. This permits the molding and discharging of articles of certain contour from the mold which could not be successfully molded and ejected from machines embodying the three part mold constructions. In addition, it simplifies the die construction. After the lower die section is tilted and the article is discharged it is tilted back to normal position after which it receives a new charge of material. Then the dies are closed and the cycle progresses as before.

Before describing the detailed construction of the dies and the operation of the machine the machine cycle will be briefly explained.

The machine includes a series of dies which progress around a track through continuous and successive loading, pressing, heating and unloading cycles or steps. The sequence of operations upon one die is as follows: The die is first unlocked at an unlocking station. The die assembly then advances to another station by which time the upper section of the die has been raised. While passing through the second station or stage, the lower section of the die is tilted to permit the article therein retained to be discharged from the die. Upon leaving this station the die is tilted back to normal position to receive a new charge of material. It then advances to a loading station where it is charged. As the die assembly leaves the loading station the upper die is closed and at the next or fourth station the dies are pressed together by suitable pressing means and thereafter locked. The die assembly then progresses forward and is heated for the proper length of time after which it again returns to the unlocking or first station whereupon the operations previously mentioned are repeated.

Among the articles which are particularly difficult to manufacture and which the present machine and die construction is particularly adapted to form I may mention doll-heads, pipe cases and other like hollow articles which are comparatively thin in cross section and which have a curved contour which is such that it makes them extremely difficult to both eject from the mold and to form when the material is loaded and pressed into the mold.

In the drawings,

Fig. 1 is a top plan view of a fragmentary section of the machine showing several operating stations.

Fig. 2 is an end view of one of the die assembles, this view being taken substantially on lines 2—2 of Fig. 1.

Fig. 3 is an enlarged sectional view showing the upper and lower die sections closed with an article therebetween. The section is taken substantially on lines 3—3 of Fig. 2.

Fig. 4 is a sectional view taken at right angles to Fig. 3 and substantially on lines 4—4 of that figure.

Fig. 5 is a top plan view of one die unit with certain parts broken away to show the construction beneath. This view is taken substantially as shown by the arrows 5—5 in Fig. 4.

Fig. 6 is a view similar to Fig. 4 but with the upper die section elevated and with the lower die section tilted to discharge the article therefrom.

Figs. 7 to 10 inclusive show the various successive steps in the die operations.

Fig. 7 shows the upper and lower dies separate and with a charge of material in the lower die section.

Fig. 8 shows the two die sections together with an article formed between them.

Fig. 9 shows the upper die section elevated and with the completed article retained in the lower die section.

Fig. 10 shows the upper die section still elevated and with the lower die section tilted preparatory to discharging an article therefrom.

Fig. 11 is a view of a conveyor construction for advancing the dies and shows part of the driving mechanism.

Fig. 12 is a detail view of the cam mechanism for actuating the devices which relock the dies.

Referring to Fig. 1, this figure shows lower pairs of tracks 11 and a fragment of the upper track 12. Each die assembly includes a lower bolster or frame section 13 which is provided with downwardly extending flange portions 14 which rotatably support the supporting rollers 15 which in turn rest upon the lower tracks 11. Each die assembly preferably includes four supporting rollers 15 as clearly shown in Fig. 1.

Referring now to Fig. 5, each bolster 13 is provided with trunnion bearings 16 and 17. These trunnion bearings receive studs 18 which are both suitably fixed, as by pins, to the die frame 20. The die portion 21 is of the desired contour to form the article to be made and as shown in Fig. 4, I have shown this as a double construction so that each die assembly is adapted to mold two articles. It will be understood that any desired number of mold cavities can be provided depending upon the article which is to be made. The lower halves of each die are flat, as shown at 22, in order to cooperate with the pressing devices. The die frame 20 is also provided with an overhanging lip or shoulder 23, which lip extends outwardly from the die frame 20 to a sufficient extent to extend over the edge of the bolster 13. When the lower die is in non-tilted position this shoulder 23 cooperates with the top of the bolster 13 as shown in Fig. 4. When the die is tilted to the position shown in Fig. 6 the lip 23 is adapted to cooperate with the top of the bolster. The die in swinging to the position shown in Fig. 6 is adapted to strike the bolster with considerable force thereby imparting sufficient shock to dislodge the previously molded article from the die.

Fig. 6 shows the pair of articles which are here a pair of doll-heads marked 24 as dislodged from the die and received upon an unloading member 25. This unloading can be operated in any desired manner to carry away the articles from the machine.

In order to impart a tilting movement to the die the studs 18 have fixed thereto pinions 26. These pinions mesh with racks 27 which are slidably mounted in guides in brackets 28 which are fixed to the bolster 13 (see Fig. 3). The means for operating these racks will hereafter be described.

Referring now to Figs. 3 and 4, each die assembly includes an upper bolster or frame member 29, which frame member at one side is provided with suitably supported rollers 30 which cooperate with the upper track 12. The upper frame member 29 is also provided with bosses to receive posts 31, which posts are fixedly mounted in the lower die bolster 13. To preserve the alignment of these posts each pair of them are provided with suitable tie straps 32. The upper die members 33 are shaped of proper contour to form the article to be molded and are secured in any desired manner to the upper bolster 29. Preferably the die sections 33 are provided with annular lip portions 34 which completely enclose and cooperate with the lower die sections 21. In this way the die and mold sections 21, 33, when closed, form a completely closed mold and prevent the material being forced out when pressure is applied. They also sharply define the edge of the article which is molded. The track 12 is provided with proper inclines at various points in the machine to raise and lower the upper die bolster 29 and the die members 33 which are attached thereto at the proper times in the machine cycle.

In order to heat the dies I provide gas pipes 34 and 35. The former are disposed inside the upper die sections 33 and the latter are disposed adjacent the lower die section 21. These pipes are supplied with gas through suitable flexible leads or in any desired manner and gas heating flames may be regulated by automatic control valve devices so that the heat can be raised and lowered or can be at constant temperatures as desired.

After the material is loaded and the upper die section is closed down by the tracks the upper and lower die sections are subjected to pressure from any suitable pressing devices. For example, the lower die may pass over fixed pedestal or platen 36 and the upper die bolster 29 may pass under a hydraulically operated ram marked 37 in Fig. 3. After the pressure is applied to the material and the dies have completely seated together it is necessary that the dies be locked together and retained locked during the heating cycle. For this purpose locking devices are provided which will now be described.

At each corner of the upper bolster 29 there is an extended slotted portion 38 adapted to receive upper and lower locking cam members 39 best shown in Fig. 3. Fig. 5 shows the cam locks 39 in unlocked position and in Fig. 1 the die assembly at the extreme right is shown with the cam members 39 in locked position engaging over and under the extensions 38 on the upper bolster 29. The cam locks 39 are preferably secured or integral with vertical operating shafts 40 which extend downwardly and at their lower ends carry pinions 41. Meshing with these pinions are racks 42 which are suitably slidably guided in the brackets 28. It will be understood that the cam locks are rotated to displace the same from locking to unlocking position or vice versa.

The means for operating the various locking devices and lower die tilting devices will now be described. Each pair of racks 27 which control the tilting of the dies are connected together by a cross bar 45 which is provided with a follower roller 47. The racks 42 which control the unlocking and locking are similarly connected together by a cross member 46 which is provided with a follower or cam roller 48. Arranged to cooperate with these cam rollers and at the side of the machine are cam tracks 43 and 44. As a die assembly approaches the station marked A in Fig. 1 the cam tracks cooperate with roller 48 to displace the racks 42 inwardly to unlock the cam locks. The die assembly then passes onward to the station marked B, and in the direction of the arrows. During its passage to station B the tracks 12 elevate the upper die members until they assume the position indicated in Fig. 6. As the die assembly passes into this station the cam tracks 44 cooperate with the cam follower 47 to displace the racks 27 and tilt the lower die assembly to the position shown in Fig. 6. The lower die at the end of its tilting movement is given a sharp knock by the lower lip 23 reacting against the bolster 13. The die assembly then passes onward from station B towards station C. The cam 44 then tilts the dies back to normal position ready to receive a charge at station C. After the material is loaded at station C the upper track 12 permits the upper die member to close and subsequently the die assembly passes to station D where pressing is effected.

While the die assembly is stationary at station D it is pressed by a suitable hydraulic device 37. Before the pressure applied by this hydraulic device is released provision is made for relocking the die. Fig. 1 shows the parts at station D in locked condition. For effecting the locking at this station it will be appreciated that the locking action must be effected while the die assembly is stationary inasmuch as it is impossible to move the die assembly when it is being subjected to heavy hydraulic pressure. For this purpose the cam element 43$^a$ is provided adapted to cooperate with roller 48. The cam member 43$^a$ is pivoted at 50 and the free end of the cam member 43$^a$ is connected by a linkage 51, 52 and 53 (Fig. 12) to a cam follower 54 cooperating with a suitable cam 55. The cam 55 is fixed to a shaft 56 which is geared through gearing 57 with the main drive shaft 58 of the machine. By the instrumentalities just described the racks 42 are actuated at the time pressure is applied by the hydraulic device to thereby actuate the die locking members 39. The die assemblies then advance through the heating cycle previously described and thereafter repeat their operating cycle as previously traced.

What I claim is—

1. A die comprising in combination a plurality of separable die parts supported to permit the same to travel together, and means for tiltably supporting one of said parts to permit said die part to be reversed to allow an article carried thereon to be discharged therefrom.

2. A molding apparatus comprising a plurality of die assemblies each assembly being composed of a plurality of separable parts, both of said parts being supported to permit the same to travel together, means for tiltably supporting one of said parts of each assembly and means for imparting a tilting movement to said tiltably supported part to reverse the same and discharge the molded article therefrom.

3. A molding apparatus comprising a plurality of separable die parts consisting of an upper part and a co-operating lower part having a mold cavity therein open at the top, means for automatically separating the parts after an article has been molded, means for automatically tilting the lower die part containing the mold cavity to such position as to permit the molded article to be discharged by gravity from the mold cavity, means for restoring the tilted die to normal position for receiving a charge of the material and means for thereafter reclosing the dies.

4. A die comprising in combination with a travelling frame or bolster, a die assembly carried thereby for molding articles and comprising a plurality of parts, means for tiltably supporting one of said parts containing a mold cavity upon said travelling bolster and means for tilting said part relatively to said bolster to permit the molded article to be discharged from the mold cavity in said part.

5. A die comprising in combination with a travelling frame or bolster, a die assembly carried thereby for molding articles and comprising a plurality of parts, means for tiltably supporting one of said parts containing a mold cavity upon said travelling bolster and means for tilting said part relatively to said bolster and imparting a shock thereto to dislodge the molded article in said part from the mold cavity.

6. A die comprising in combination with a travelling frame or bolster, a die assembly carried thereby for molding articles and comprising a plurality of parts, means for tiltably supporting one of said parts containing a mold cavity upon said travelling bolster, means for tilting said part relatively to said bolster and for imparting a shock thereto to dislodge the article from the mold cavity, means for subsequently restoring the tilted die to normal position and for retaining the same in such position preparatory to receiving a new charge of material.

7. A molding machine comprising cooperating die parts, a support therefor, means for supporting both die parts on said support so that the cooperating die parts can travel together, individual trunnions for tiltably mounting one of each of said cooperating die parts upon said support, means for automatically opening and closing the dies, and means for reversing the die part containing the molded article to discharge the latter and for thereafter restoring the said part to non-reversed position.

8. A molding machine comprising a plurality of travelling die assemblies, each including a plurality of die parts both parts of which are adapted to travel with the assembly and form a complete traveling closed mold cavity and means operable after the molding operations have been completed for reversing the die part which contains the mold cavity containing molded article or articles to thereby permit the article or articles to drop out of said cavity or cavities.

9. A molding machine comprising a plurality of travelling die assemblies, each including a plurality of die parts, certain of said parts being provided with female mold cavities, means for locking and unlocking the die parts, means for opening and closing the dies, and means for tilting the die parts which are provided with mold cavities when the latter are open after the molding of articles to dislodge the articles therefrom.

10. A die comprising in combination a plurality of separable die parts, means for tiltably supporting one of said die parts to permit the die to be reversed for discharging an article therefrom, and means for imparting a shock to the tilted part when tilted to effect the dislodgment of the molded article from said part.

11. A molding apparatus comprising a plurality of traveling die assemblies, supportig to travel together in a rectilinear path, each said assembly comprising a plurality of separable parts, and means for effecting a tilting movement of one of the parts of each assembly to dislodge a molded article therefrom.

12. A molding apparatus comprising a movable carrier, a plurality of die assemblies carried thereby, each assembly comprising a plurality of separable parts, one of the aforesaid parts of each assembly having a trunnion mounting upon said carrier to permit said part to be tilted and individually reversed to discharge the molded article therefrom.

13. A molding apparatus comprising a series of traveling die assemblies including die parts constituting mold cavities, and means for individually tilting said mold cavity parts independently of each other to permit tilting of one cavity part while retaining the other cavity parts in non-tilted position.

In testimony whereof I hereto affix my signature.

ERNEST DE JOURNO.